United States Patent [19]

Heitmann

[11] Patent Number: 4,558,376

[45] Date of Patent: * Dec. 10, 1985

[54] METHOD AND SYSTEM OF REPRODUCTION OF MAGNETICALLY RECORDED VIDEO SIGNALS AT SPEEDS DIFFERING FROM RECORDING SPEED

[75] Inventor: Jürgen Heitmann, Seeheim, Fed. Rep. of Germany

[73] Assignee: Robert Bosch GmbH, Stuttgart, Fed. Rep. of Germany

[*] Notice: The portion of the term of this patent subsequent to Jul. 24, 2001 has been disclaimed.

[21] Appl. No.: 323,456

[22] Filed: Nov. 20, 1981

[30] Foreign Application Priority Data

Dec. 3, 1980 [DE] Fed. Rep. of Germany ....... 3045543

[51] Int. Cl.$^4$ ............................................ H04N 5/782
[52] U.S. Cl. .................................. 360/10.1; 360/10.2; 360/10.3
[58] Field of Search ..................... 360/10.1, 10.2, 10.3, 360/70, 75, 76, 77, 78

[56] References Cited

U.S. PATENT DOCUMENTS

| | | | |
|---|---|---|---|
| 3,678,186 | 7/1972 | Narita | 360/10.2 |
| 4,055,768 | 3/1981 | Kubota | 360/78 X |
| 4,139,867 | 2/1979 | Foerster | 360/10.3 |
| 4,189,758 | 2/1980 | Morio et al. | 360/78 X |
| 4,197,562 | 4/1980 | Kikuya et al. | 360/10.3 |
| 4,268,875 | 5/1981 | Morio et al. | 360/10.3 X |
| 4,361,857 | 11/1982 | Sakamoto | 360/10.2 X |
| 4,462,049 | 7/1984 | Heitmann | 360/77 X |

FOREIGN PATENT DOCUMENTS

| | | | |
|---|---|---|---|
| 0115131 | 10/1978 | Japan | 360/10.3 |
| 0188982 | 10/1980 | Japan | 360/10.3 |

Primary Examiner—Robert L. Richardson
Attorney, Agent, or Firm—Frishauf, Holtz, Goodman & Woodward

[57] ABSTRACT

To provide for reproduction of video signals from a magnetic recording tape in which the video signals have been recorded at a speed different from the reproduction speed, so that, upon passage of the tape about a reproducing drum, in a spiral path, the recording angle of the inclined tracks differs from the reproducing scan track (compare tracks 3–7 and 11, 12 of FIG. 1b), a further magnetic head is provided and so positioned that the signals which are not scanned by one head are, effectively, scanned by another head; by use of a programmed memory, the signals can be stored in proper sequence for reproduction as essentially complete TV signals, for read-out in accordance with a desired TV scanning standard, in analog or digital signal form.

11 Claims, 14 Drawing Figures a)   b)

METHOD AND SYSTEM OF REPRODUCTION OF MAGNETICALLY RECORDED VIDEO SIGNALS AT SPEEDS DIFFERING FROM RECORDING SPEED

The present invention relates to a method and a system for reproduction of video signals which are recorded on a magnetic tape in inclined tracks at a speed which differs from the recording speed, and more particularly to the reproduction of such signals which are in digital form.

BACKGROUND

Magnetic recording of video signals is usually carried out by recording the signals in parallel tracks extending at an inclination with respect to the longitudinal edge of the tape. This is done by wrapping the tape about a recording drum or cylinder within which a head wheel, carrying transducer heads, which rotate. The particular type of recording system determines the angle of the tracks with respect to the longitudinal direction of the magnetic tape. At times it is desirable to reproduce tape which has been recorded at a given recording speed by playing back the tape at a different speed, while retaining the standard according to which the signals have been recorded. Due to the changed transport speed of the tape upon reproduction, the tracks scanned by the magnetic heads no longer will overlap the tracks as they were recorded.

Some recording systems record such that the signal data corresponding to one video field or frame are distributed over several tracks. If such a tape is then reproduced at a speed differing from the recording speed, the respective signal portions may be reproduced in a wrong sequence.

It has been proposed to read-out signals at a speed differing from recording speed by providing a memory in which signals derived from the magnetic tape, which conform to predetermined requirements, are recorded, and then read-out in accordance with the respective television standard (see U.S. Pat. Nos. 4,139,867; 4,210,938; 4,293,879). A portion of the signals recorded cannot be utilized, however, in the known method due to the transition of the magnetic head from one track to the next. The magnitude of this portion which is not read-out depends on various parameters, such as track width, gap width, and track angle, that is, the angle of inclination of the tracks with respect to the longitudinal edge of the tape. At some predetermined relationship between recording tape speed and reproduction tape speed, the system causes difficulties which are particularly severe; for example, if the tape reproduction speed is twice as high as the recording speed, then those signals which occur in the first field cannot be reproduced at all, since they are not scanned in the second field and in the subsequent field. Specific speed relationships thus should be avoided; others are preferred. In the known systems, therefore, signals must be collected from a plurality of recorded fractions of the fields so that, upon reproduction of subject matter which includes fast-moving sequences, errors and misinformation result.

THE INVENTION

It is an object to provide a method and system to permit reproduction of signals which were previously recorded on a tape at a reproduction speed which is different, and in which the disadvantages of the prior art are essentially avoided.

Briefly, a scanning head wheel is provided which has at least two magnetic transducer heads placed thereon and so positioned that they are simultaneously in transducing contact with the tape. The respective speed of the magnetic tape and the position of the transducing head with respect to each other are so selected that the number of magnetic heads which are in transducing contacting position with respect to the tracks on the tape is a maximum.

In accordance with a feature of the invention, the head wheel carries two transducing heads which are so positioned that both heads are in contact with the tape and when one of the heads scans a track, the other one is off a track, for example over the gap or safety band between tracks.

The system has the advantage that a substantial portion of the signals which are recorded can be reproduced in slow motion or, respectively, in speeded-up or accelerated motion with standard television magnetic recording apparatus, in which each field is recorded on a plurality of tracks. Thus, the reproduced image quality, particulary in fast motion or accelerated motion, is improved.

DRAWINGS

Figures 5, 6:
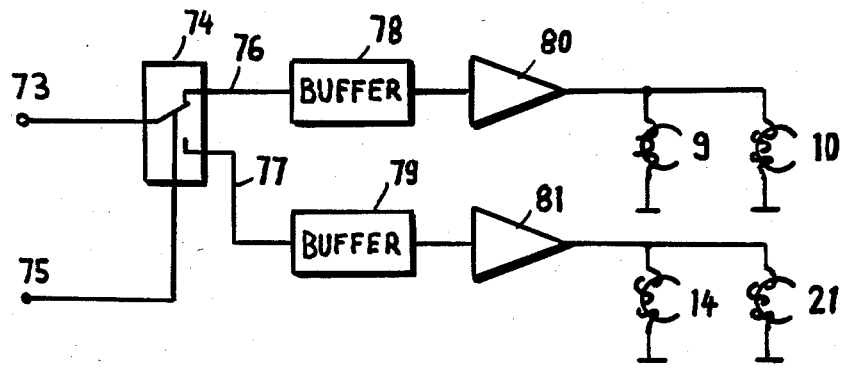

FIG. 5 and FIG. 6, consisting of a–f, show a block diagram and a time diagram relating to the distribution or scrambling of the signals on two tracks.

Figure 1:
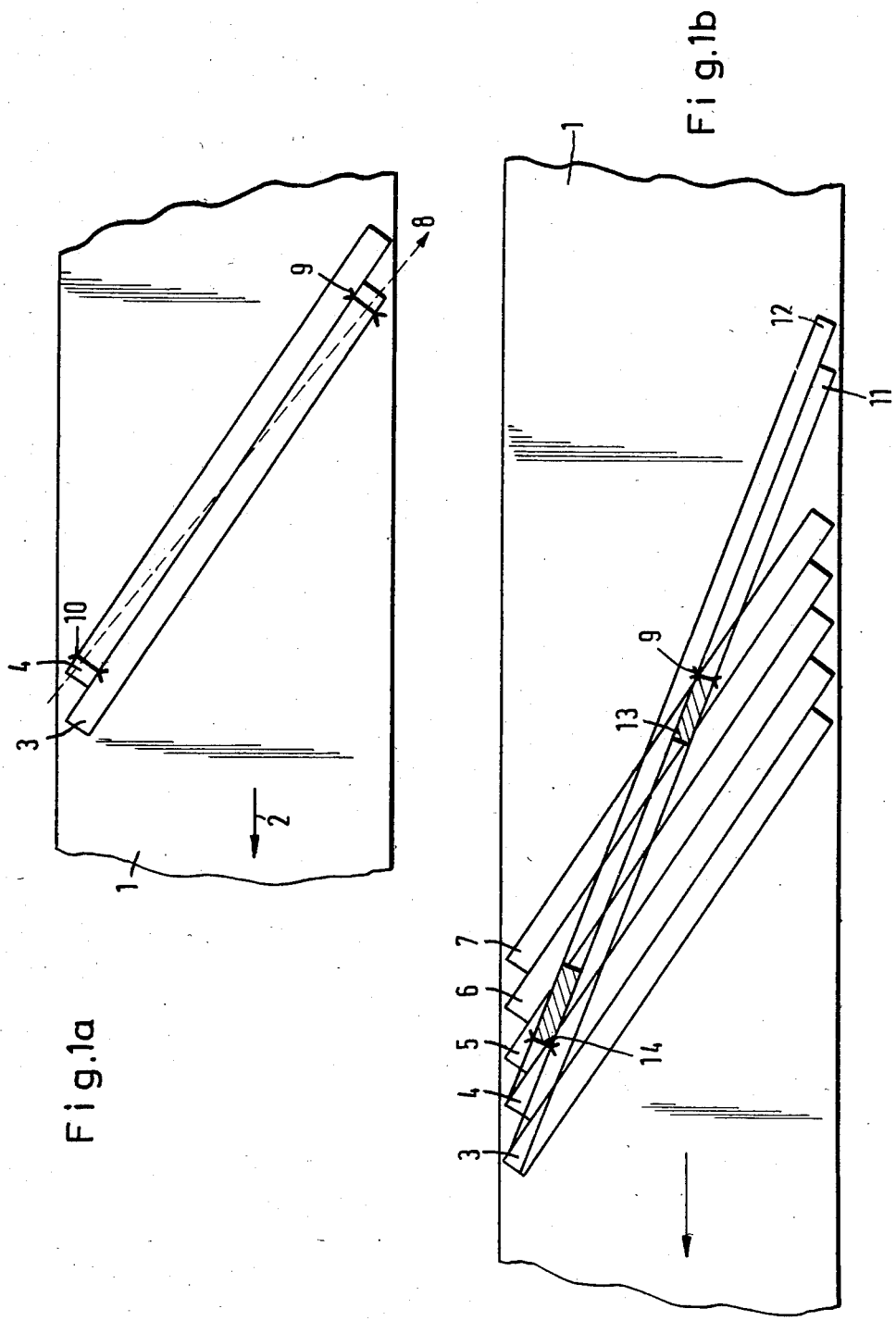
FIG. 1a is a highly schematic representation of television signal recording tracks on a recording tape.
FIG. 1b is a graphic illustration of the position of the tracks scanned by reproducing heads with respect to the tracks as recorded if, upon reproduction, the tape operates at a different speed than upon recording.

A magnetic tape 1—see FIG. 1a—is moved in the direction of the arrow 2 to a scanning drum. The tape is wrapped about the scanning drum by an angle somewhat in excess of 180°, for example about 190°. Two recorded tracks, 3, 4 are shown in FIG. 1a; these recorded tracks were recorded on the tape, and form tracks which extend at a predetermined angle with respect to the edge of the tape.

FIG. 1a, further, shows highly schematically the gaps of two magnetic heads 9, 10. As the tape is wrapped about a head wheel drum, the heads 9, 10 move with respect to the tape in the direction of the broken line 8, and as indicated by the arrow thereon, from the top to the bottom. For ease of illustration, only the gaps of the magnetic heads are shown. Due to superposition of the movement of the tape and of the head wheel, the magnetic heads 9, 10 follow the tracks 3 and 4. For example, the head 9 is shortly before the end of scanning of track 3; head 10 has just started with scanning of the track 4.

If the magnetic tape is moved at a speed different from recording, the tracks of the magnetic heads upon reproduction will no longer coincide with the recorded tracks. FIG. 1b illustrates the condition in which the reproduction speed is higher than the recording speed. The direction of the recorded tracks 3, 4, 5, 6, 7 no longer coincides with the tracks which the heads follow upon operation in the reproduction or read-out mode. Only two such tracks, namely the read-out tracks 11, 12, are shown for clarity of illustration. Of the two heads 9, 10, as customary 180° offset on the head wheel, only the head 9 is shown in FIG. 1b for simplicity.

As clearly seen in FIG. 1b, at the time interval indicated by the hatched line 13, head 9 has accurately reproduced the signals from track 7. As the head 9 moves farther towards the right, that is, lower on the track 11, it leaves the track 7 and begins to produce reproducible signals only when a sufficiently large portion of its gap is on the next adjacent track. In accordance with a feature of the invention, the time interval until the head 9 again is capable of reproducing useful signals is utilized to obtain signals from an additional head 14. Preferably, head 14 is positioned at an angular offset of 90° with respect to head 9. To complement head 14, a further head 10 is also provided.

As seen in FIG. 1b, head 14 begins to cover a track which essentially is in alignment with track 5. The signals derived from track 14 do not fit the signals provided by head 9 if customary recording methods are used, since the position of the signals representing image areas of the video field does not match the position of the image areas of the video field scanned by the track 9. It is not a necessary requirement, however, that sequential signals fit sequential image areas, since a buffer memory for short-time storage of video signals can be used. In the system of FIG. 1b, it is assumed that the transport speed of the tape 1 is so selected that at least one of the heads 9, 14 is on the tracks which are shown. This is a limitation of reproduction to a certain set of speed relationships. In accordance with a further feature of the invention—illustrated graphically in FIG. 2—at least one of the heads can be shifted in the direction of the axis of the head wheel.

Shift of the heads for tracking, in axial direction, can be carried out at low speed, in contrast to high-speed repositioning of heads as used previously to control tracking, since the relative axial shift of the heads is the same for any specific relationship of tape recording vs. tape reproduction speed.

Figure 2:
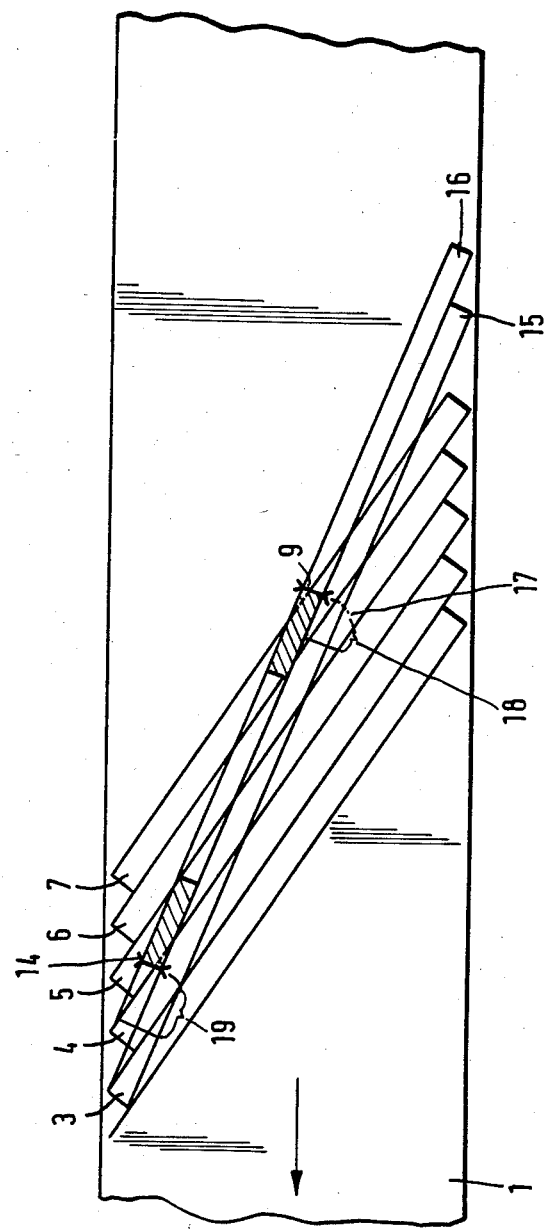
FIG. 2 is a representation of tracks illustrating another embodiment.

Referring to FIG. 2: A portion of the tape 1 is again shown, having tracks 3-7. The tape is moved at a speed which differs from that of recording speed, and which is different from the speed relationship shown in FIG. 1b, so that the magnetic heads have a different angle on tracks 15, 16. The position of magnetic head 9 is shown to be the same as that in FIG. 1b, at location 17. Heads 9 and 14 would, with the specific relationship shown, cover the paths 18, 19 at the same time and thus deliver signals which are unsuitable since, within the path portions 18, 19, the heads are partially on tracks 6 and 7, or on tracks 4 and 5, respectively. If, however, head 9 is placed in a position shown by solid lines from the position 17, namely shifted axially by the width of one track, then head 9 will scan track 7 during the interval shown in broken line, whereas head 14, at the same time, scans the portion 19, that is, a time at which no useful signals can be derived therefrom. When head 9 leaves track 7, head 14 starts to scan track 5 and supplies a suitable signal during the portion that the cross-hatched path is being covered.

As can readily be seen, the axial repositioning of the head 9 depends on the tape speed with respect to the track inclination. Thus, the relationship of reproduction tape speed with respect to recording tape speed is not limited to predetermined specific proportions.

Figure 3:
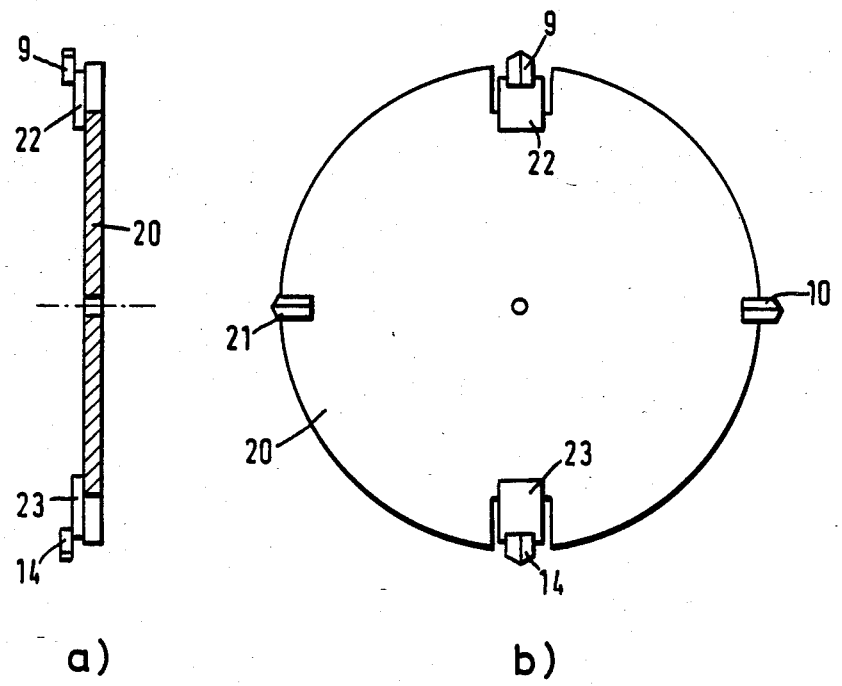
FIG. 3a is a part-sectional, part-edge view of a head wheel.
FIG. 3b is a front view of a head wheel.

FIG. 3, collectively, shows a head wheel suitable to carry out the method, and useful in the system of the present invention, in which FIG. 3a is a part-sectional view, and FIG. 3b a top view. Head wheels for recording of video signals are well known, and the details thereof need not be described specifically.

The head wheel which is suitable for the present invention utilizes heads 9, 10, 14 and 21. Heads 10 and 21 are mounted, as is usual, directly on the head wheel. Heads 9 and 14 are located on piezoelectric transducers 22, 23 which, in turn, are secured to the head wheel 20. The piezoelectric transducers 22, 23 are illustrated in the form of bending oscillation transducers, for example with a cantilever arrangement, positioned in suitable notches or reliefs at the edge of the head wheel, and permitting deflection of the heads 9, 14 in two axial directions. Deflection of the heads 9, 14 is controlled by application of suitable electrical fields to electrodes applied to the surfaces of the piezoelectric transducers.

The adjustment position, as shown, is merely one example of a simple electrically controllable adjustment of the axial position of magnetic heads. As has been noted, the positioning of the transducer heads can be effected slowly, that is, for example, in synchronism with change of the reproduction tape speed. Various other arrangements to change the axial position of the heads with respect to the plane of the head wheel, and hence the heads 10, 21, may be used.

Figure 4:
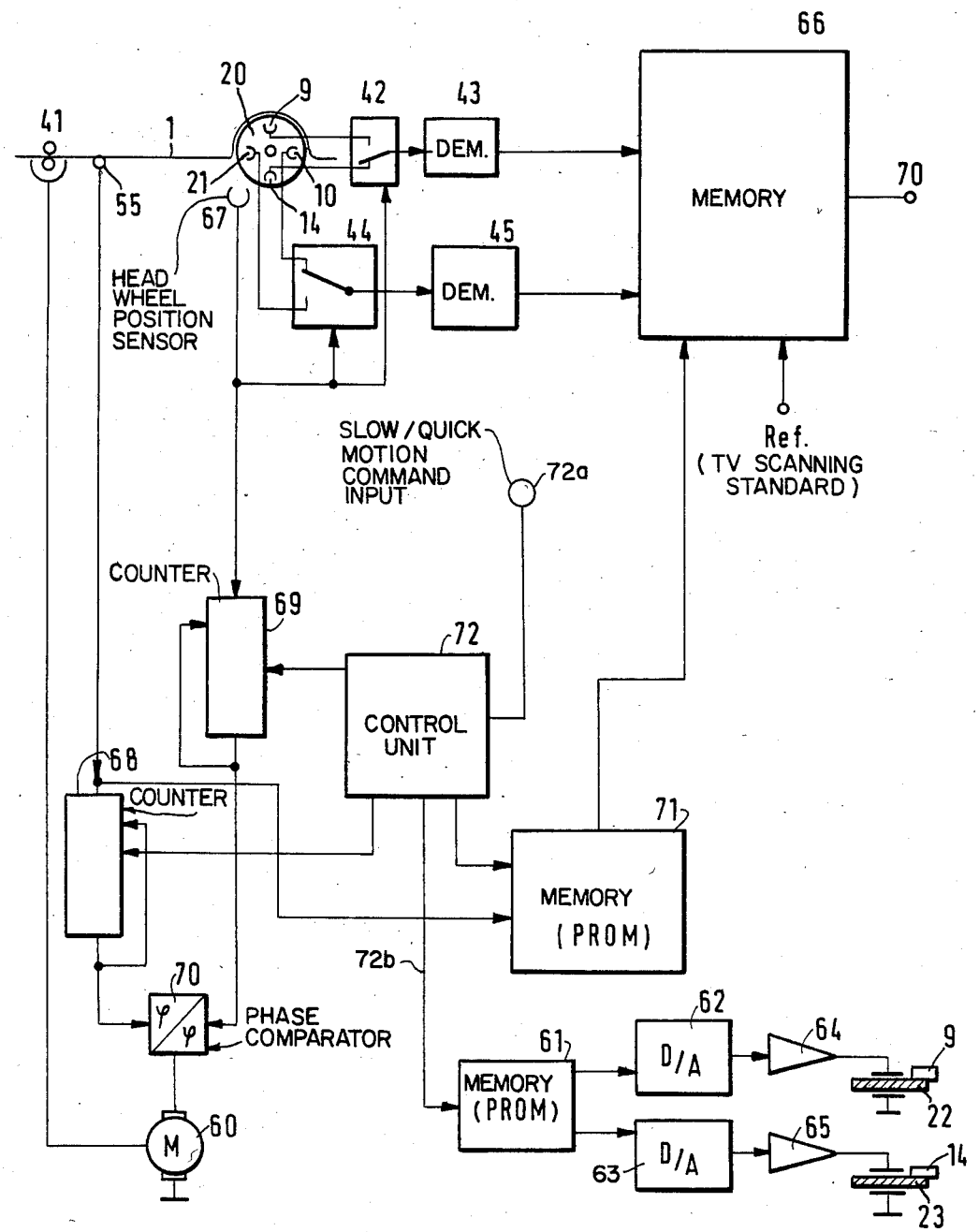
FIG. 4 is a schematic circuit diagram.

A circuit system suitable to carry out the present invention is shown in FIG. 4. The magnetic tape 1 is wrapped about a head wheel 20 by a wrap angle of slightly more than 180°, for example about 190°. Head wheel 20, which may be of the type shown in FIG. 3, carries the heads 9, 10, 14, 21. At any time, two oppositely positioned heads are in contact with the tape. The tape 1 is moved about the head wheel by a drive system 41, driven by a motor 60. Drive system 41 may be the usual tape capstan drive. A sensor 67 is located in the vicinity of the head wheel which provides signals representative of the position of the head wheel 20 with respect to a reference position. The heads 10 and 21 are connected to the inputs of a transfer switch 44; the heads 9 and 14 are connected to the inputs of a second transfer switch 42. The transfer switches 42, 44 are controlled as a function of head wheel position, as sensed by sensor 67, to apply at any time those signals which are generated by heads which are in contact with the tape. The transfer switches 42, 44 conduct the output signals to demodulators 43, 45. The example assumes frequency modulated recording; it is, however, equally possible and advantageous to utilize the system with different types of recordings, for example to use digitally coded signals. Suitable structural changes in the system of FIG. 4 can readily be devised by utilizing current engineering knowledge.

Most video magnetic recording tapes carry, besides the information signals, an additional track which has control signals impressed thereon to provide for synchronization of information. A scanning head 55 is provided, which scans the control track and provides control pulses to a counter 68. Control pulses from the head wheel position sensor 67 are applied to a counter 69. The adjustment of the different scanning speeds, for recording and reproduction, respectively, is controlled by a control unit 72 which controls the reset pulses to the respective counters 68, 69. The counters 68, 69 thus are so programmed that when they receive a predetermined count value, they are reset to zero and, upon resetting, provide a corresponding count pulse to the phase comparison circuit 70. Counters 68, 69 thus operate as frequency dividers with a controllable division ratio. Thus, the actual tape speed can be determined, with reference to normal or standard operating speed, and can be controlled, very exactly, within a wide range. If the heads are positioned fixedly on the head wheel, that is, in accordance with the embodiment illustrated in FIG. 1b, only some of the speed relationships can be used which are theoretically possible in order to reach a rapid and complete reproduction of the image content of the video signals which have been recorded. If the heads, however, are movably placed on the transducer, for example as illustrated in connection with FIGS. 2 and 3, then a substantially greater number of speed relationships can be used. The axial deflection of the magnetic heads 9 and 14—see FIG. 2—is also be controlled from the control unit 72. The actual tape speed, as commanded by the control unit 72, is applied as a signal on line 72b to a programmable read-only memory 61 (PROM). The PROM 61 contains the information which determines the axial deflection or axial shift necessary to scan the tracks, in accordance with the embodiment illustrated in FIG. 2, at specific speed relationships of reproduction to a known recording speed. The value of the requisite deflection is derived as a digital signal from the PROM 61, and converted by a digital/analog converter 62, 63, amplified in amplifiers 64, 65, and then applied to the electrodes of the piezo-electric deflection transducers 22, 23 which support the magnetic heads 9, 14, respectively. The outputs from the amplifiers 64, 65 thus control the axial position of the transducers 9, 14 in accordance with the required deflection under the specific speed relationships, as determined by the control unit 72 and the PROM 61.

Some prior art structures usually contain a further PROM which can retain addresses of respective lines of a field, that is, which determine the position of the scanned line within a complete TV field or frame. In accordance with the present invention, the PROM 71 receives addresses, with respect to the speed relationships, of those portions of signals from a track which can be received by the respective heads from the track 1 and without interference, that is, which can be read properly from any one of the tracks. These addresses are then used to control the recording process of the signals received from the heads, and stored in a memory 66 which stores the video signal informtion, for example on a frame-by-frame basis, or otherwise, for example for further recording. The memory 66 receives reference pulses from a reference source which provides output signals in accordance with the respectively used television reproduction standard, for example the 525 line/60 Hz, frame interlace standard. The output 70 from the memory 66 then provides TV signals, at the respective standard, which are directly available for display.

The system and method can be used to transduce both as well as digital signals. The system and method is particularly applicable for use with digitally encoded video signals since the digital signals need not necessarily follow each other in a time sequence which is governed by the original scanning, and determined by the television scanning standard. Digital signals can be stored or handled in small blocks, for example, or in words of random sequencing pattern, so that the signals from the heads 9, 10 and 14, 21, respectively, can be so recorded that the information content of the various signals effectively supplement each other.

Various changes and modifications may be made; the example selected shows an arrangement with a wrap angle of tape about the head wheel of somewhat more than 180°, for example about 190°. The system in accordance with the present invention may be used with other arrangements, however, for example with a wrap angle of 270°, or slightly in excess thereof, to insure contact of a transducer on the head wheel with the tape before a preceding transducer has left the tape. Again, four heads on the circumference of the head wheel are suitable with such an arrangement of a wrap angle somewhat in excess of 270°.

FIG. 5 shows a block diagram of the circuit enabling the splitting of the signals to be recorded into both recording channels. FIG. 6 shows schematically signals at various points of the diagram according to FIG. 5. For instance a digital color television signal is applied to input 73 of an electronically controlled switch 74. This digital color television signal is shown schematically in FIG. 6, line a, and is a serial signal comprising the components Y (luminance), U, and V (color difference signals). Each letter thereof stands for the value of (e.g. 8 bits) of a picture element. Because the resolution of the luminance component is higher than the resolution of the chrominance components, the signal comprises a number of luminance values which is twice as high as the number of the color difference values each.

A signal shown in FIG. 6b is supplied to the input 75 of the circuit according to FIG. 5. This signal causes the switch 74 to be during four digital words in one and during the following four digital words in the other position. Therefore, the digital words Y1, U1, Y2, and V1 are transferred to the first output 76 of the switch 74 (see line c in FIG. 6) and the digital words Y3, U3, Y4, and V3 occur at the output 77 of switch 74. In order to have continuous data flows, two buffers 78 and 79 are arranged at the outputs of the electronic switch 74. Such buffers are well known in the art and expand the input signals by the time factor 2 as it is shown in lines d anf f of FIG. 6. These digital signals pass an output stage each 80 and 81, and are recorded by means of the heads 9,10 (14,21). Even if one recording channel is disturbed, principally the whole picture is reproduced but having a lower resolution during the time of the disturbance. A similar arrangement as shown in FIG. 5 but in an inverted sense can be used for multiplexing the signals which are reproduced by both pairs of heads.

I claim:

1. Method of reproduction of video signals which are magnetically recorded on magnetic tape (1), looped about a head wheel (20), in which the speed of reproduction differs from a known recording speed, and in which, upon recording, data representing the video signals are recorded on tracks (3, 4, 5, 6, 7) which are inclined with respect to a longitudinal edge of the tape so that, upon reproduction at a different speed, the scanning tracks (11, 12; 15, 16) of a reproduction head (9, 14, 10, 21) on the head wheel (20) do not coincide with the recorded tracks (3, 4, 5, 6, 7)

comprising the steps of temporarily storing the reproduced signals which are of a quality sufficient for reproduction;

reading-out, at a predetermined television scanning standard, the temporarily stored signals subsequent to their having been stored;

and further including the steps of providing at least two axially adjustable transducer heads (9, 14; 10, 21) on the head wheel (20);

and controlling the relative axial position of the at least two transducer heads on the head wheel with respect to each other as a function of the relationship between recording speed and reproduction speed to place a maximum number of transducer heads (9, 14; 10, 21) in scanning transducing position over the previously recorded tracks (3, 4, 5, 6, 7).

2. Method according to claim 1, wherein, at any instant of time, at least one transducer head (9, 14; 10, 21) is positioned in transducing contact with a portion of a recorded track (3–7).

3. Method according to claim 1, wherein two magnetic heads (9, 14; 10, 21) are simultaneously in contact with the tape (1);

and wherein, when one of the heads (e.g. 14) is positioned with respect to the recorded tracks (3–7) on the tape such that it will not reproduce signals from any of the tracks, the other one of the heads (9) is in transducing position with a track recorded on the tape.

4. Method according to claim 1, wherein the video signals are digital signals, and the recording tracks contain said digital signals distributed over a plurality of channels;

said digital video signals being so scrambled within the respective channels that the video signals which are read-out or reproduced by the reproducing heads (9, 14; 10, 21) from the recorded tracks (3–7) substantially complement each other to form video signals for essentially complete video frames or fields, respectively;

and said step of temporarily storing the reproduced signals comprises storing the video signals in the form of essentially complete video frames or fields.

5. Method according to claim 1, wherein the position of said transducer heads (9, 14; 10, 21) on the circumference of the head wheel (20) is fixed;

and wherein said controlling step for reproduction of the tracks includes the step of changing the axial position of the heads on the head wheel to place a maximum number of magnetic heads in scanning transducing position over the previously recorded tracks (3–7).

6. Method according to claim 1, wherein four heads are provided positioned at about 90° from each other on the head wheel.

7. System for reproduction of video signals which are magnetically recorded on the magnetic tape (1) looped about a rotating head wheel (20), at a reproduction spread which differs from recording speed, in which, upon recording, data representing video signals are recorded on tracks (3, 4, 5, 6, 7) which are inclined with respect to the longitudinal edge of the tape so that, upon reproduction, the scanning tracks (11, 12; 15, 16) of a reproduction transducer head (9, 14; 10, 21) do not coincide with the recorded tracks (3–7) and comprising a buffer memory coupled to the reproduction transducer head for temporarily storing the reproduced signals which are of a quality sufficient for reproduction;

means for subsequent read-out of the buffer memory at a predetermined television scanning standard, at least two axially movable magnetic transducer heads (9, 14; 10, 21) spaced angularly from each other and positioned on the scanning head wheel supplying their signals to the buffer memory;

means (68, 69, 70, 72) for determining the speed of the tape during reproduction in relation to a known speed of the tape during recording and for providing a speed relation control signal (72a)

and means (22, 23) for controlling the axial positions of the heads as a function of the relationship between the recording speed and the reproduction speed of the tape to place a maximum number of magnetic heads, during reproduction in scanning transducing position over the previously recorded tracks (3–7), said position control means being connected to and responsive to the speed relation signals.

8. System according to claim 7, wherein the at least two magnetic heads (10, 14; 9, 21) have a fixed position with respect to each other.

9. System according to claim 7, wherein the position control means comprises means for axially moving at least one of the magnetic heads (9, 14) to a controlled axial position with respect to at least one of the other (10, 21) magnetic heads, parallel to the axis of rotation of the head wheel (20).

10. System according to claim 9, wherein the speed control means comprises a control unit (72), and memory means (61) are provided, controlled by said control unit and controlling the relative axial position of the relatively movable transducer head with respect to the fixed transducer head in accordance with a predetermined relationship, stored in said memory means, to place at least one of said magnetic heads on a recorded track (3–7) when another of said transducer heads is in a position with respect to said recorded tracks such that it will not reproduce signals from any of the tracks.

11. System according to 7, wherein four heads are provided and the angle of angular spacing of the transducer heads is about 90° from each other.

* * * * *